United States Patent
Sawai (10) Patent No.: US 6,176,492 B1
(45) Date of Patent: Jan. 23, 2001

(54) PISTON RING FOR SHOCK ABSORBER (75) Inventor: Seiji Sawai, Iwata (JP)

(73) Assignee: Yamaha Hatsudoki Kabushiki Kaisha, Iwata (JP)

(*) Notice: Under 35 U.S.C. 154(b), the term of this patent shall be extended for 0 days.

(21) Appl. No.: 09/131,534

(22) Filed: Aug. 10, 1998

(30) Foreign Application Priority Data

Aug. 8, 1997 (JP) .................................................. 9-214968

(51) Int. Cl.$^7$ .................................................. B60T 11/236
(52) U.S. Cl. .................. 277/461; 277/498; 188/322.18
(58) Field of Search .................................... 277/449, 459, 277/460, 461, 463, 464, 465, 496, 498; 188/322.18

(56) References Cited

U.S. PATENT DOCUMENTS

| 3,814,445 | * | 6/1974 | Bitzan | 277/461 X |
| 4,422,649 | * | 12/1983 | Howarth | 277/464 X |
| 4,592,559 | * | 6/1986 | Harvey | 277/465 X |
| 4,785,922 | * | 11/1988 | Kiehart | 277/459 X |

* cited by examiner

Primary Examiner—Anthony Knight
Assistant Examiner—Karlena D. Schwing
(74) Attorney, Agent, or Firm—Knobbe, Martens, Olson & Bear LLP (57) ABSTRACT A number of embodiments of piston sealing arrangements for shock absorbers having a hydraulic cylinder in which a piston is slidably supported to define a pair of fluid chambers. The piston is provided with a peripheral groove in which a sealing piston ring is provided. A number of different communicating passage arrangements are formed in the piston ring that communicate the exterior surface of the piston ring which engages the cylinder bore with the interior surface of the piston ring which faces the ring groove so as to balance the pressure therebetween. In each embodiment a seal is provided between the piston ring groove and the piston ring so as to preclude fluid flow from one fluid chamber to the other through the piston ring groove and the communicating passage arrangement.

20 Claims, 12 Drawing Sheets

PISTON RING FOR SHOCK ABSORBER

BACKGROUND OF THE INVENTION

This invention relates to a shock absorber construction and more particularly to an improved sealing piston ring arrangement for a shock absorber.

A common type of shock absorber used for suspension systems and other purposes employs a piston that is slidably supported within a hydraulic cylinder. The piston and/or cylinder are provided with passages that extend between opposite sides of the piston and which include an arrangement for damping the flow therethrough. This provides a hydraulic damping action, as is well known in the art.

With this type of arrangement, however, there is also provided a seal on the exterior surface of the piston which engages and seals with the cylinder so as to preclude fluid leakage past the seal that would permit fluid to bypass the damping arrangement mentioned. However, these types of arrangements provide certain problems, as may be best understood by reference to FIG. 1 which shows a conventional seal of the type utilized in shock absorbers.

Figure 1:
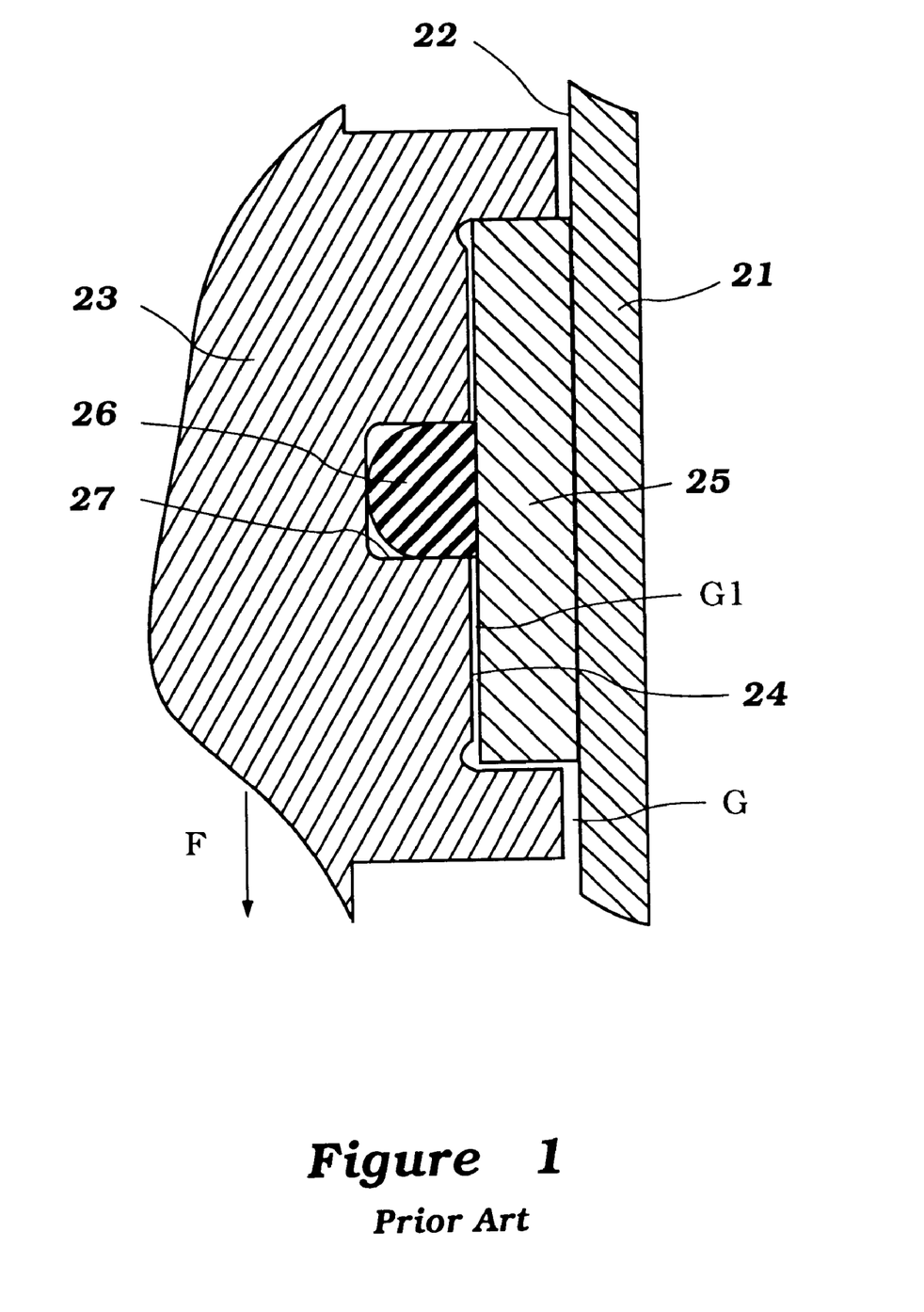
FIG. 1 is an enlarged, cross-sectional view taken through a portion of a shock absorber constructed in accordance with a prior art type of configuration.

FIG. 1 shows a portion of a shock absorber arrangement of the prior art type and this shock absorber mechanism is shown only partially and in cross-section to indicate the problems associated with the seal therein. The overall construction of the shock absorber in which the sealing mechanism is employed may be of any known type and such structures will be shown later in describing the preferred embodiment of the invention in FIG. 2.

Nevertheless, the shock absorber includes an outer cylinder 21 which defines a cylinder bore 22 in which a piston 23 reciprocates. The cylinder 22 is filled with hydraulic fluid so as to form chambers above and below the piston 23. In addition, flow passages are provided between the two chambers, normally in the body of the piston 23, through which fluid may flow in a damped fashion so as to damp the suspension movement with which the shock absorber is associated.

In order to provide a seal and insure against leakage around this shock absorbing passage arrangement, at least one piston ring groove 24 is formed in the outer peripheral surface of the piston 23. A piston ring 25 is provided in this piston ring groove 24. This piston ring 25 may be of any type of construction and is pressed by its own resilience and by that of an O-ring 26 into sealing engagement with the cylinder surface 22. The O-ring 26 is received in a groove 27 formed in the exterior surface of the piston 23 at the base of the ring groove 24.

As may be seen in this Figure, if the piston 23 is forced downwardly relative to the cylinder 21 in the direction indicated by the force arrow F, the piston ring 25 will slide slightly upwardly and bottom against the upper side of the ring groove 24 of the piston 23.

Thus, some fluid under pressure may enter into this area through a gap G that exists between the exterior surface of the piston 23 and the cylinder 22. This pressure can then flow into a further gap area $G_1$ behind the piston ring 25.

Thus, a hydraulic pressure is exerted which acts in conjunction with the pressure of ring 25 and the O-ring 26 to force the piston ring 25 into tight engagement with the surface 22 of the cylinder 21. This restricts motion and can cause imprecise action of the shock absorber.

Arrangements have been proposed for reducing this effect by permitting a passage that will communicate the exterior surface of the piston ring with its interior surface. However, such passages then provide a path through which fluid may leak from one end of the piston ring to the other. Thus the shock absorbing system will be partially bypassed.

It is, therefore, a principal object of this invention to provide an improved piston ring arrangement that can be utilized with shock absorbers or other similar arrangements.

It is a further object of this invention to provide an improved piston ring arrangement wherein compressive pressure in one of the fluid chambers defined by the associated piston will not act on the piston ring to vary its sealing force with the cylinder in which it is received.

SUMMARY OF THE INVENTION

This invention is adapted to be embodied in a piston sealing arrangement for a shock absorber having a hydraulic cylinder in which a piston is slidably supported. The piston is provided with a peripheral groove in which a sealing piston ring is provided. A communicating passage arrangement is formed in the piston ring that communicates the exterior surface of the piston ring which engages the cylinder bore with the interior surface of the piston which faces the ring groove so as to balance therebetween. A seal is provided between the piston ring groove and the piston ring so as to preclude fluid flow from one fluid chamber to the other through the piston ring groove and the communicating passage arrangement.

DETAILED DESCRIPTION OF THE PREFERRED EMBODIMENTS

Figure 2:
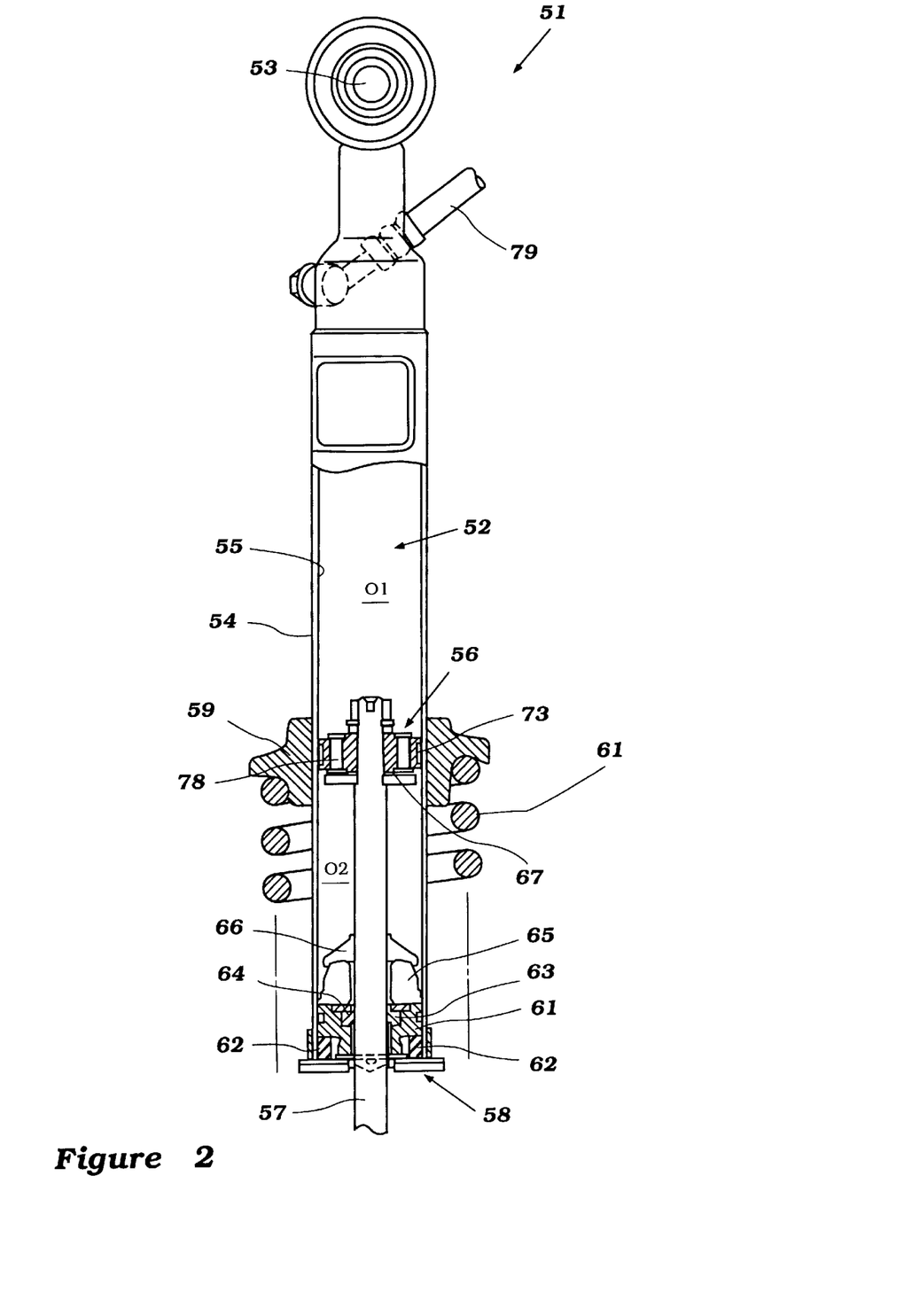
FIG. 2 is a side elevational view, with a portion broken away and shown in cross-section, of a shock absorber constructed in accordance with an embodiment of the invention and shows the general environment in which the various embodiments hereinafter described may be employed.

Referring first in detail to FIG. 2, a shock absorber and vehicle suspension unit that forms the environment in which the invention is adapted to be employed is identified generally by the reference numeral 51 and also shows a first embodiment of the invention. Although the invention is described in conjunction with a shock absorber for a wheel suspension unit of a vehicle, it should be readily apparent that the sealing ring or piston ring constructions described herein can be utilized in a wide variety of other uses, particularly those utilized to pressurize fluid chambers.

The shock absorber 51 includes a main cylinder unit 52 that carries a trunnion 53 at one end thereof for attachment to an associated vehicle body. The cylinder unit 52 includes a tubular body member 54 that defines a cylinder bore 55 in which a piston assembly, indicated generally by the reference numeral 56 is slidably supported.

The piston 56 has affixed to it a piston rod 57 and which extends through an end closure assembly, indicated generally by the reference numeral 58, that is positioned adjacent an open end of the tubular member 54. The opposite end thereof is closed by an integral end wall to which the trunnion 53 is affixed.

The end closure 58 provides a seal arrangement, in a manner to be described, so as to form an upper fluid chamber O1 and a lower fluid chamber O2 each of which is filled with hydraulic fluid and which are separated by the piston 56 in a manner to be described.

The piston rod 57 is adapted to be affixed to a suspension element for a vehicle grounding engaging element such as a vehicle wheel or the like. In addition, a spring retainer 59 is affixed to the cylinder member 52 and one end of a coil compression spring 60 bears against the spring retainer member 59. The other end of the coil spring 60 bears against the ground engaging element, suspension unit so that as the vehicle travels along the ground and meets of obstacles, the piston 56 will move upwardly and downwardly in the cylinder bore 55. It should be understood, of course, that the connections can be reversed, i.e., the trunnion 53 can be connected to the vehicle ground engaging element suspension unit and the piston rod 59 can be connected to the vehicle frame.

Continuing to refer to FIG. 2, the end closure 58 includes a piston rod guide 61 that carries a seal 62 at its lower end to affect a seal between a closure plate and the end of the cylinder bore 55. A rod seal 63 sealingly engages the piston rod 57 and is held in place by a retainer ring 64. Finally, a rebound stopper 65 is positioned to be engaged by a stopper holder 66 so as to engage the underside of the piston 56 to provide a snubbing action for final movement in the extreme extended position.

Figure 3:
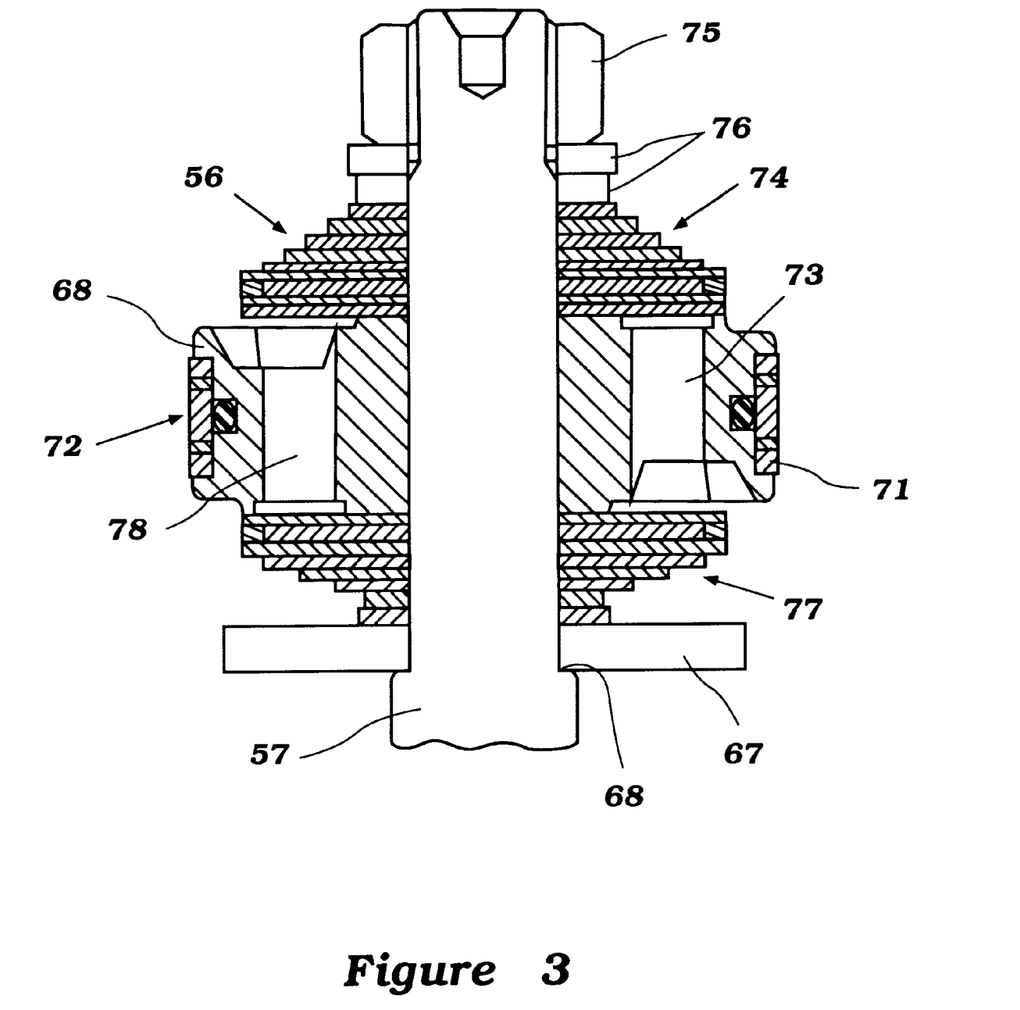
FIG. 3 is an enlarged cross-sectional view looking in the same direction as FIG. 2 and taken along the same plane and shows the shock absorber piston valving arrangement.

The piston 56 carries a damping arrangement that may be best understood by reference to FIG. 3 and which will now be described by reference thereto. The piston 56 is mounted on a reduced diameter end portion of the piston rod 57 and is engaged at its lower end with a spacer plate 67 that is affixed in abutment with a shoulder 68 formed at the step between the piston rod portions.

Figure 4:
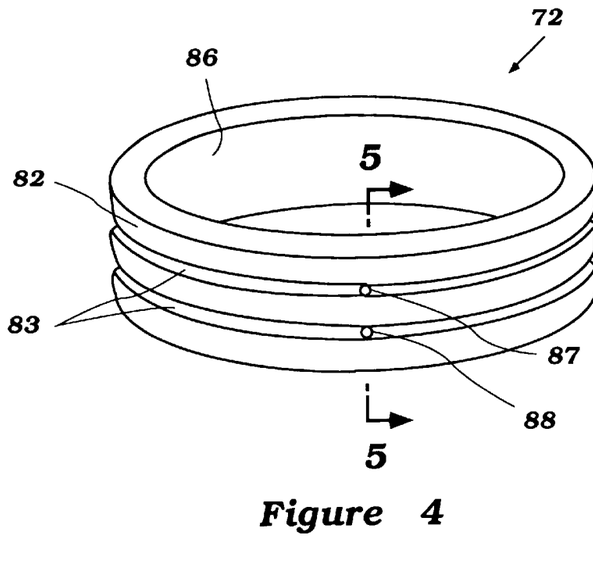
FIG. 4 is an enlarged perspective view showing the piston ring of this embodiment.
Figure 5:
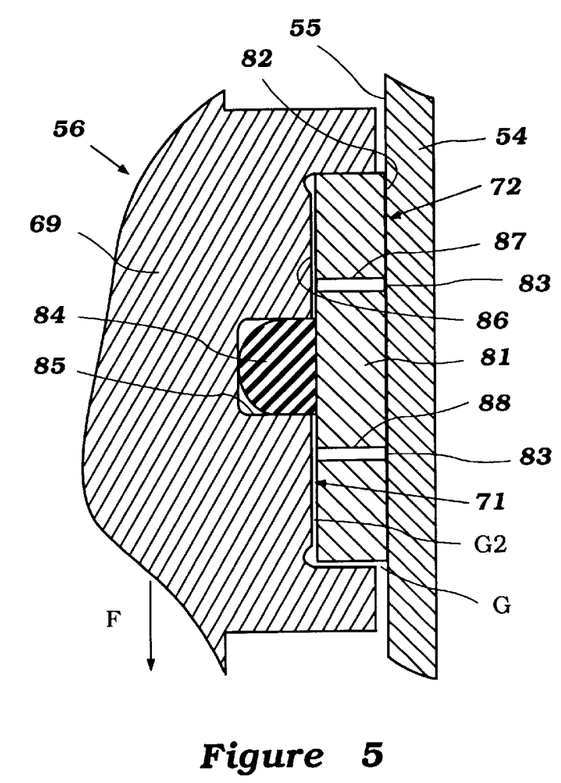
FIG. 5 is a further enlarged cross-sectional view taken along the line 5—5 of FIG.
Figure 6:
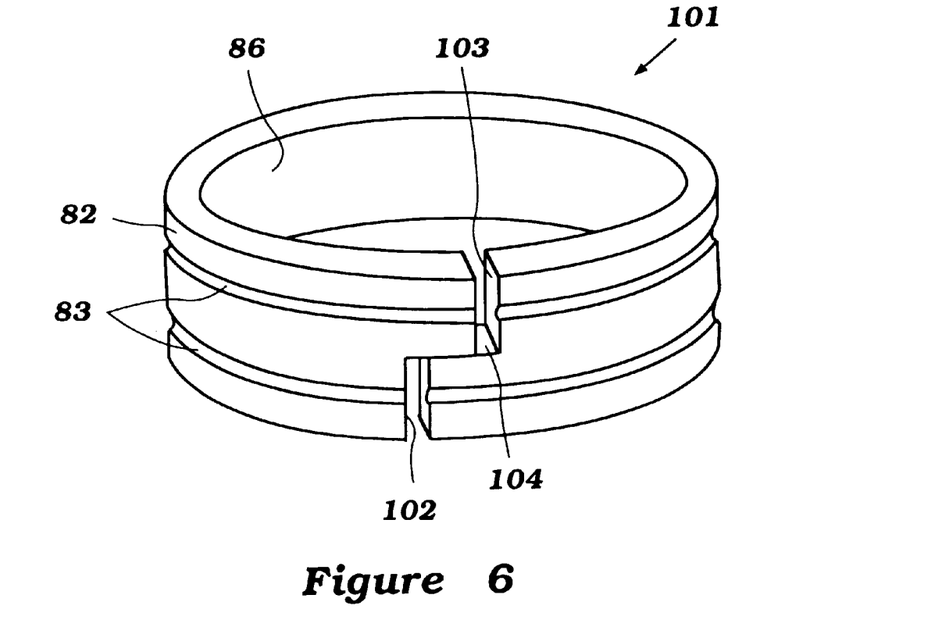
FIG. 6 is an enlarged perspective view, in part similar to FIG. 4 and shows another embodiment of the invention.

The piston 56 includes a main body member 69 that is formed with a piston ring groove 71 in which a piston ring and seal assembly, indicated generally by the reference numeral 72 and having a construction best shown in FIGS. 4–6 is mounted to affect a fluid tight seal with the cylinder bore 55.

A first set of damping passages 73 extend from the lower face of the piston body 69 to the upper face so as to permit flow from the chamber O2 to the chamber O1 under certain conditions. A stacked leaf spring arrangement 74 valves the upper end of these passages 73 and is held in place by a nut 75 on a threaded upper end of the piston rod 57 and washers or shims 76. This arrangement permits flow from the chamber O2 to the chamber O1 when sufficient force is encountered. Reverse flow, however, is precluded through the passages 73.

In a like manner, a shim spring arrangement 77 is positioned on the underside of the piston body 69 and cooperates with another series of damping passages 78 that permit flow from the chamber O1 to the chamber O2 but preclude flow in the opposite direction. These types of damping mechanisms are well known in the art and it is believed that further description of the actual damping arrangement is not necessary to permit those skilled in the art to practice the invention.

Because of the fact that the piston rod 57 occupies a portion of the fluid chamber O2, the amount of fluid displaced from the chamber O1 by the upward movement of the piston assembly 57 will be greater than can be accommodated in the chamber O2. Therefore, there is provided a makeup reservoir (not shown) that communicates with the chamber O1 through a conduit 79. This chamber may be partially filled with hydraulic fluid that is pressurized by an inert gas over a floating piston.

The construction of the shock absorber 51 as thus far described may be considered to be conventional and, for that reason, further description of it is not believed to be necessary to permit those skilled in the art to practice the invention.

The sealing structure provided by the piston ring assembly 72 will now be described by particular reference to FIGS. 4 and 5. As may be best seen in FIGS. 4 and the piston ring 72 is formed as an annular member, which may be split, and is formed from a suitable material such as a nylon or the like.

This member 72 is fitted with a clearance in the piston groove 71. The ring member 72 has a main body 81 that has a generally cylindrical outer surface 82 in which a pair of circumferentially extending, axially spaced grooves 83 are formed. The grooves 83 are actually spaced at a distance so that they will be normally positioned on opposite sides of a further groove 84 formed in the piston at the base of the piston ring groove 71.

An O-ring element 85 is positioned in this groove 84 and bears against a cylindrical inner surface 86 of the piston ring 72 so as to establish the sealing pressure between its outer surface 82 and the cylinder bore surface 55.

Positioned at spaced circumferential locations around the piston ring 72 and communicating with the grooves 83 are upper and lower relief passages 87 and 88, respectively. These passages 87 and 88 perform the function of balancing the pressure between the inner and outer surfaces 86 and 82 of the piston ring 72 so that no fluid pressure acts to augment the sealing pressure exerted by the O-ring 85.

This may be understood by reference to FIG. 5 which shows a loading condition the same as that shown in FIG. 1. This is a situation where the piston assembly 56 is being forced downwardly by a force indicated by the force vector F.

When this occurs, as with the prior art construction, the piston ring 72 will move upwardly in the piston ring groove 71 and engage the upper surface thereof. Hydraulic pressure can be exerted therefore through the gap at the lower end which is again indicated at G and flow into the area $G_1$, behind the piston ring body 81.

This fluid however, can flow through the relief passages 88 into the groove area 83 so that the pressure on both sides of the piston ring 72 is balanced and the ring sealing pressure will not be increased. However, any substantial leakage past the piston ring 72 is precluded by the O-ring seal 85. If the forces are in the opposite direction, the pressure would be relieved in the relief passages 87 with the same effect. Thus, this embodiment reduces the drag existent with prior art constructions and solves the problem of the prior art constructions.

Figure 7:
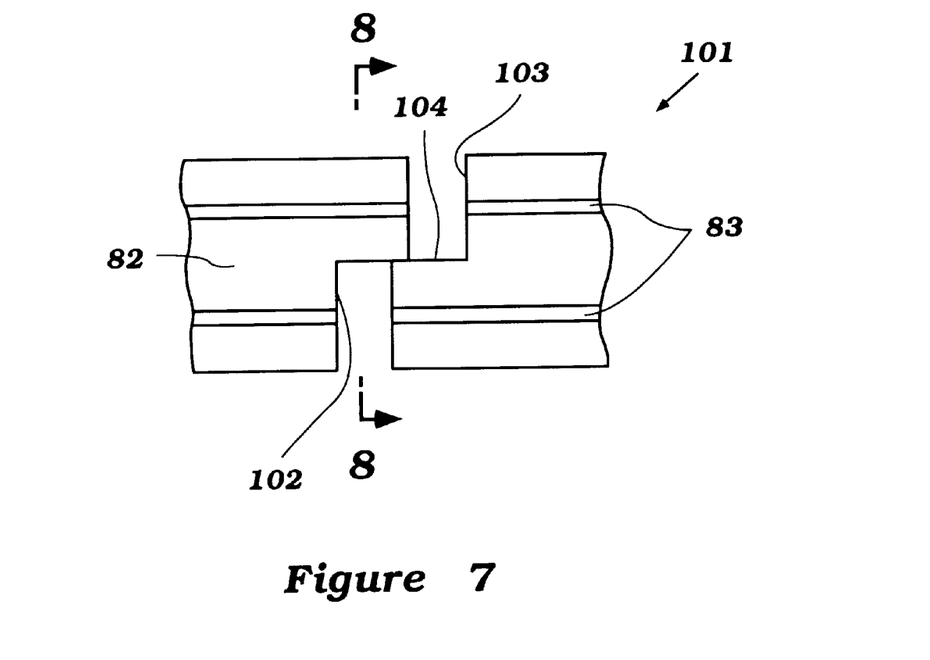
FIG. 7 is an elevational view showing the end joint in the piston ring of this embodiment.
Figure 8:
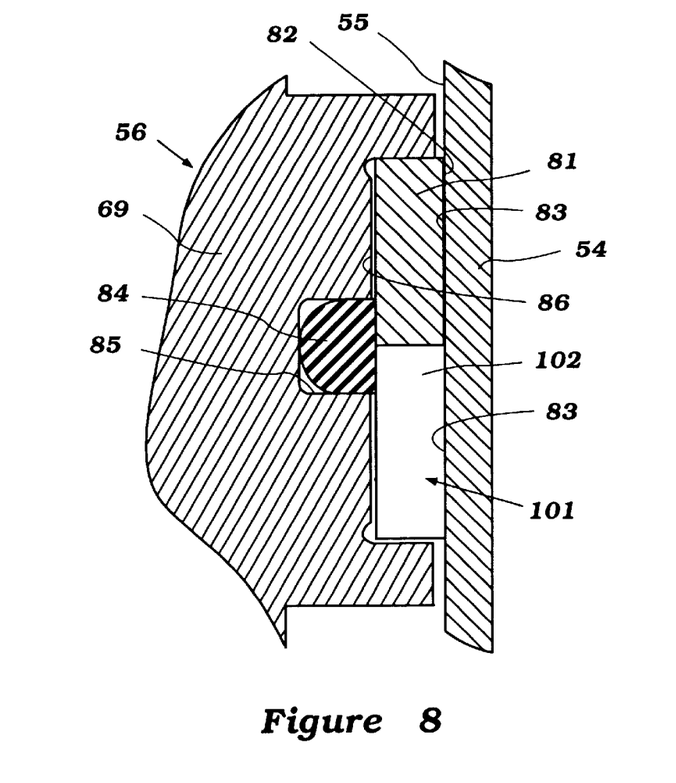
FIG. 8 is an enlarged cross-sectional view taken along the line 8—8 of FIG. 7 but shows the sealing ring in position in the cylinder.

The communicating passages 87 and 88 of the embodiment just described can be eliminated and cost reduction enjoyed by utilizing an arrangement as shown in the embodiment of FIGS. 6–8. The sealing ring of this embodiment is identified generally by the reference numeral 101 and has basically the same construction as the previously described ring 72. Thus, components are the same they have been identified by the same reference numerals and will not be described again.

This embodiment also includes the circumferential grooves 83 and the outer surface 82 of the ring body. However, the ring body is split by a staggered split arrangement shown in these figures and which comprises a first axially-extending portion 102 that extends upwardly from the lower edge of the ring 101 and to an area engaged by the O-ring seal 85 contained within its groove 84. Thus, this slot portion 102 serves the same function as the pressure balancing passages 88 of the previously described embodiment.

A further axially extending slot portion 103 extends down from the upper edge of the ring 101 and terminates at a circumferentially extending shoulder 104 that bridges the slot portions 102 and 103. Again, the slot 103 terminates in the area engaged by the O-ring seal 85 and this replaces the pressure relief passages 87 of the previously described embodiment. Thus, this embodiment has also the same effects as the previously described embodiment. Further description of this embodiment is not believed to be necessary to permit those skilled in the art to practice the invention.

Figure 9:
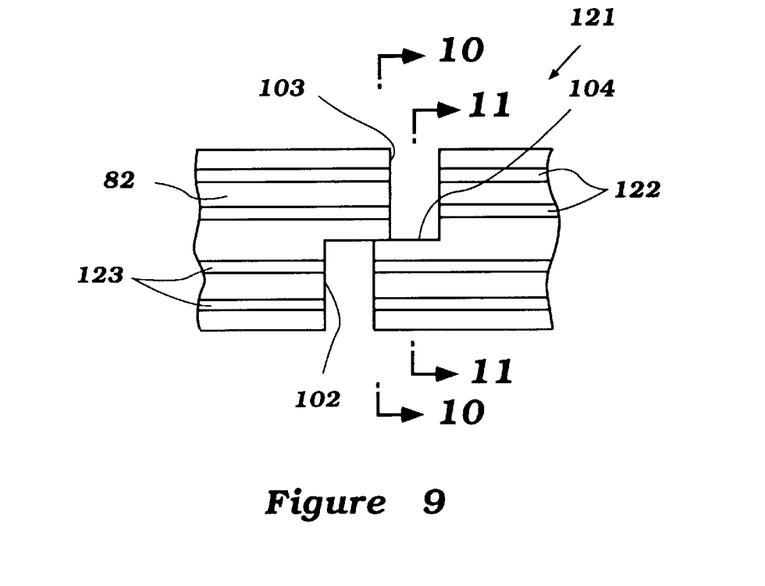
FIG. 9 is a side elevational view, in part similar to FIG. 7, and shows a further embodiment of invention.
Figure 10:
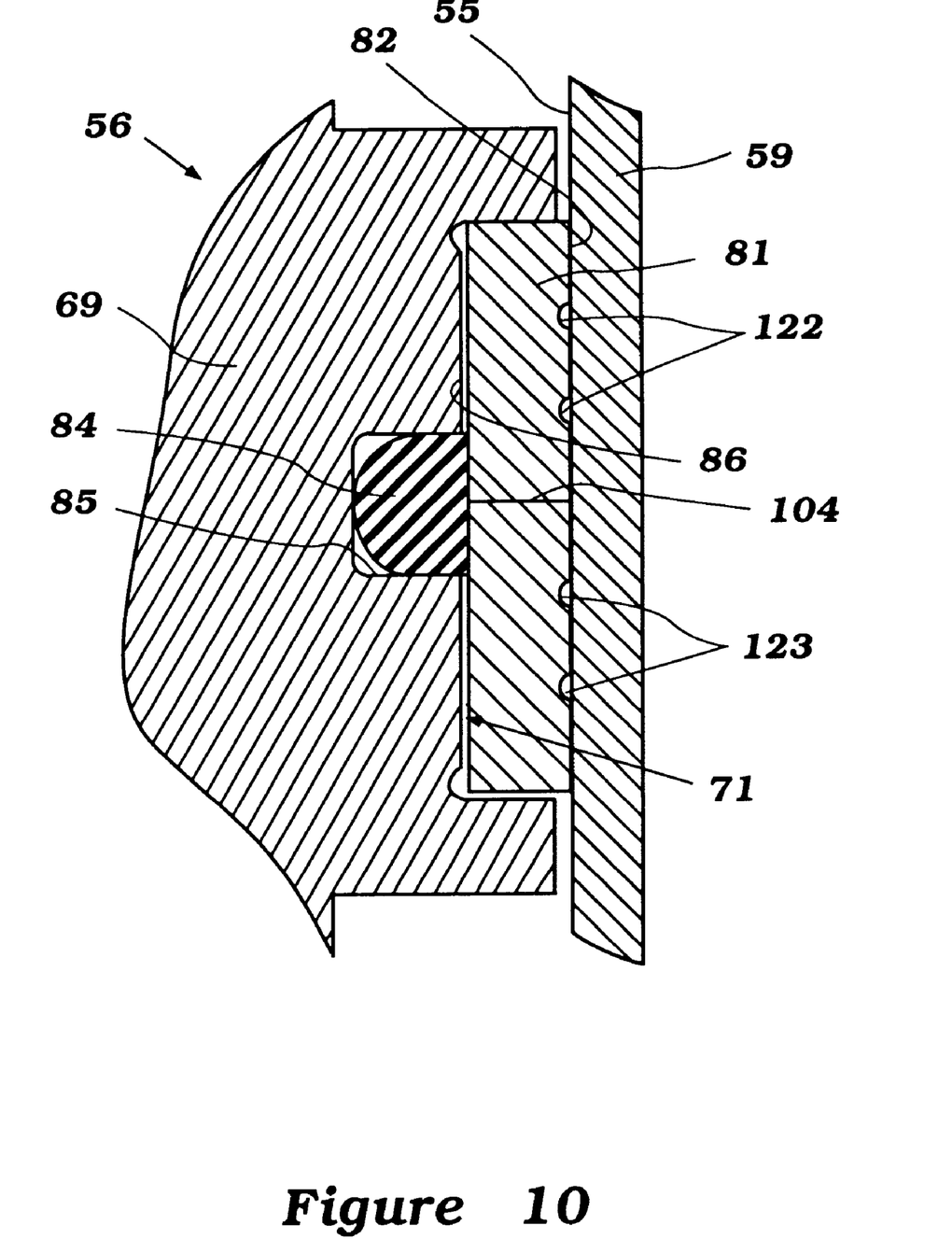
FIG. 10 is an enlarged cross-sectional view taken along the line 10—10 of FIG. 9.
Figure 11:
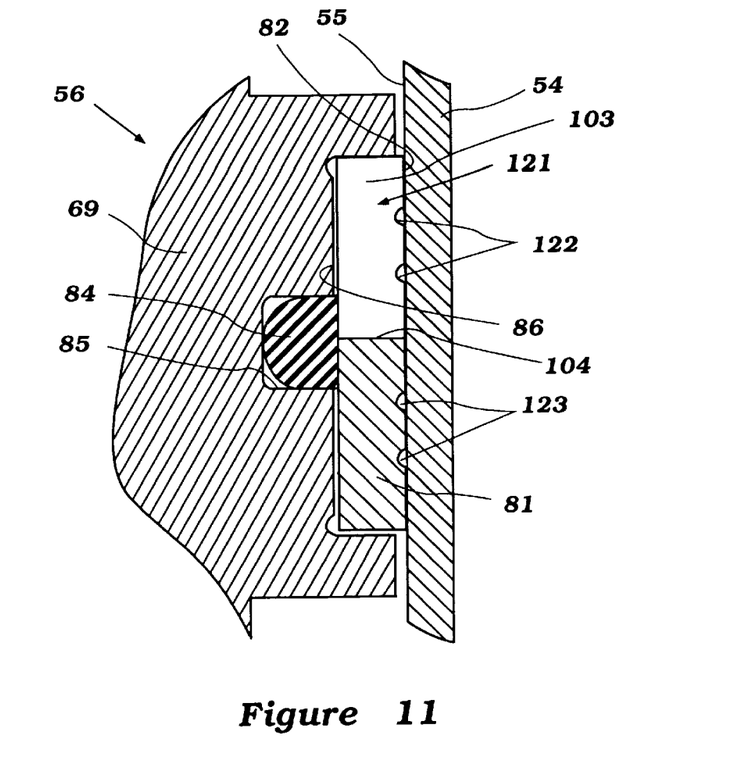
FIG. 11 is an enlarged cross-sectional view taken along the line 11—11 of FIG. 9.

FIGS. 9–11 show a seal ring constructed in accordance with a further embodiment of the invention which is identified generally by the reference numeral 121. This ring 121 differs from the ring 101 of the embodiment of FIGS. 6–8 in having a pair of grooves 122 that extend circumferentially above the lower terminus of the slot portion 103 at the shoulder 104 which provide the function of permitting fluid to flow circumferentially around the sealing ring 121 to improve its pressure balance.

In a like manner, a pair of lower grooves 123 are formed in the area below the slot portion 104 and these also further assist in the pressure balance. FIGS. 12–16 show a final embodiment in which the sealing ring is identified generally by the reference numeral 141. This sealing ring employs a slot arrangement like the embodiment of FIGS. 6–8 and, therefore, components of this ring which are the same as that embodiment have been identified by the same reference numerals.

Figure 12:
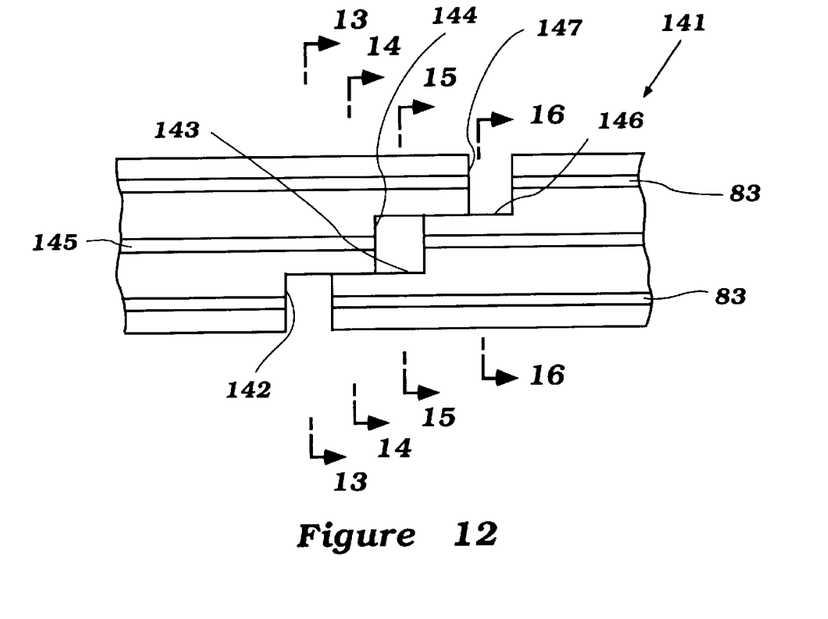
FIG. 12 is an enlarged side elevational view, in part similar to FIGS. 7 and 9 and shows a yet further embodiment of the invention.

In this embodiment, however, the slot is formed by a three-part arrangement as best shown in FIG. 12. Because of this, a pair of O-ring grooves, indicated by the reference numerals 84$u$ and 84$l$ are employed. O-rings 85$u$ and 85$l$ are positioned in the grooves 84$u$ and 84$l$, respectively. This construction appears best in FIGS. 13–15.

Figure 13:
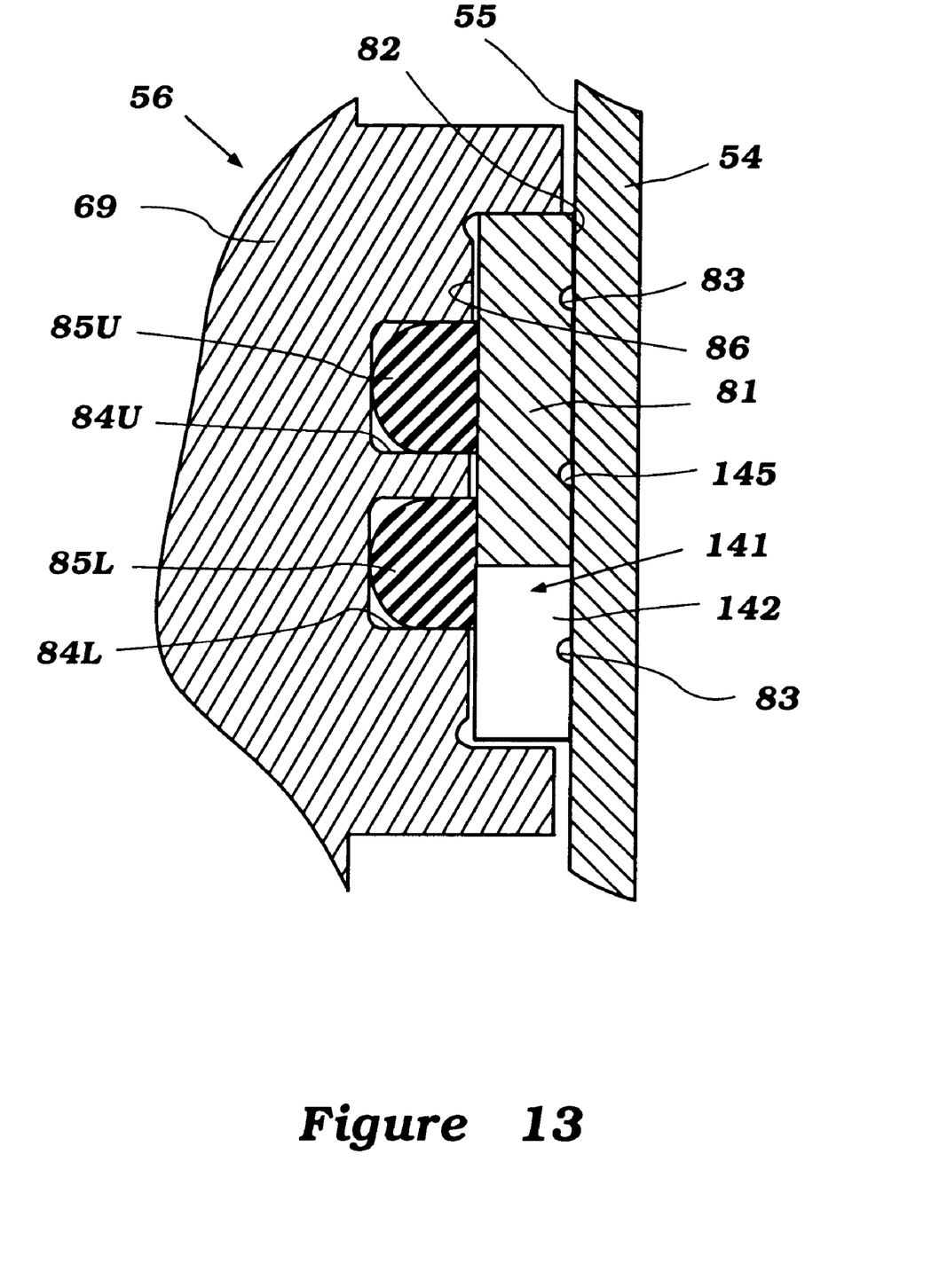
FIG. 13 is an enlarged cross-sectional view taken along the line 13—13 of FIG.
Figure 14:
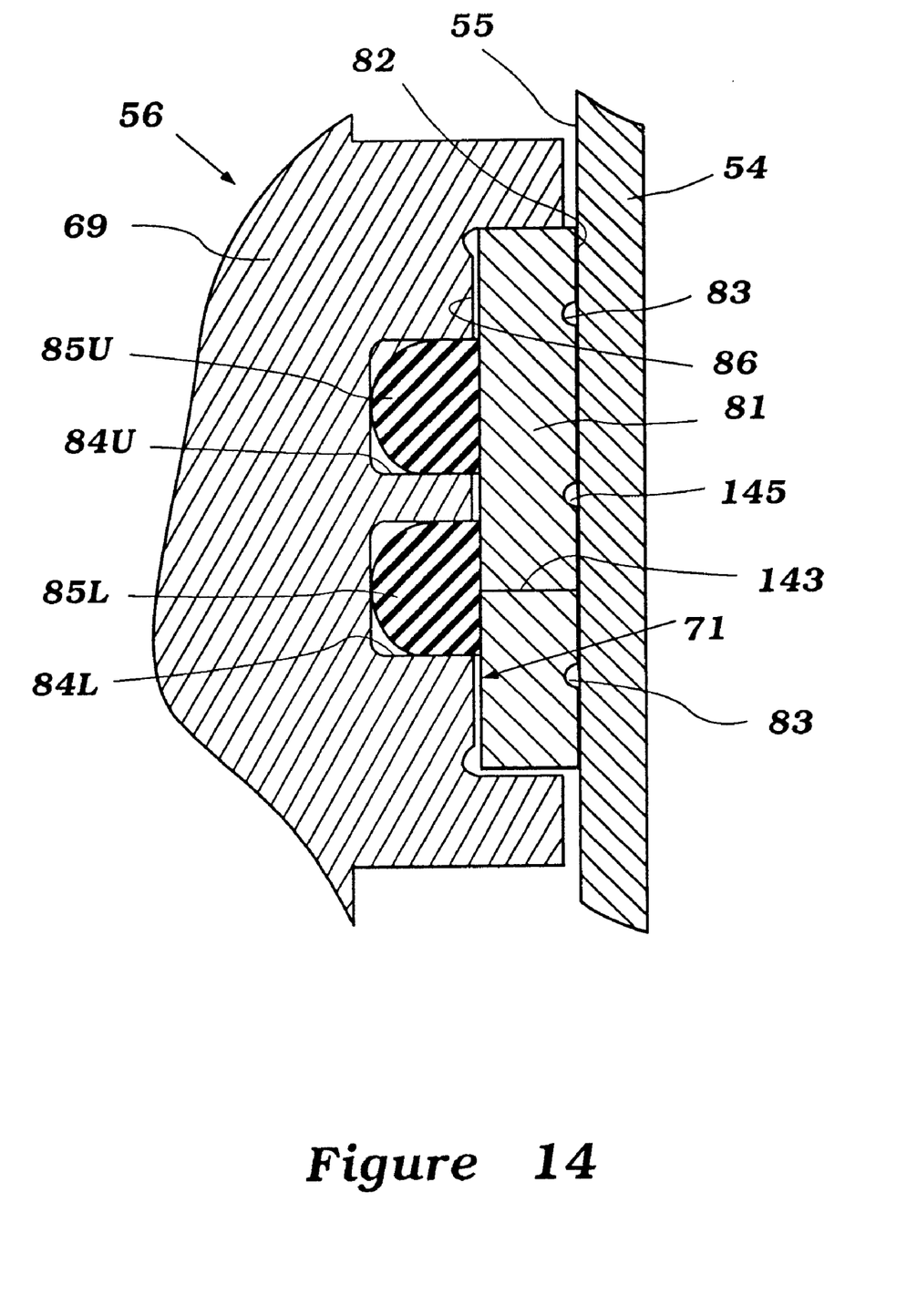
FIG. 14 is an enlarged cross-sectional view taken along the line 14—14 of FIG. 12.
Figure 15:
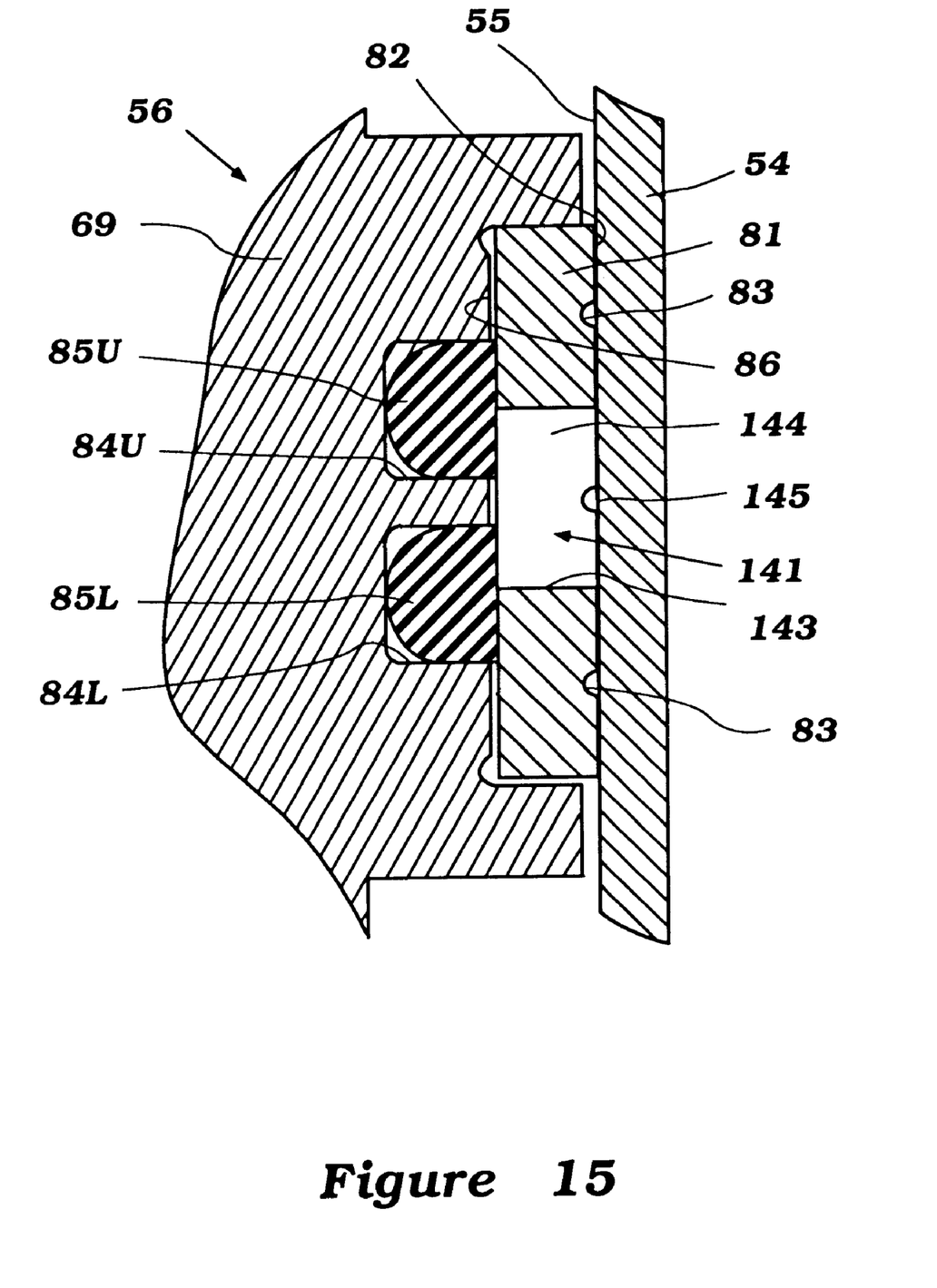
FIG. 15 is an enlarged cross-sectional view taken along the line 15—15 of FIG.
Figure 16:
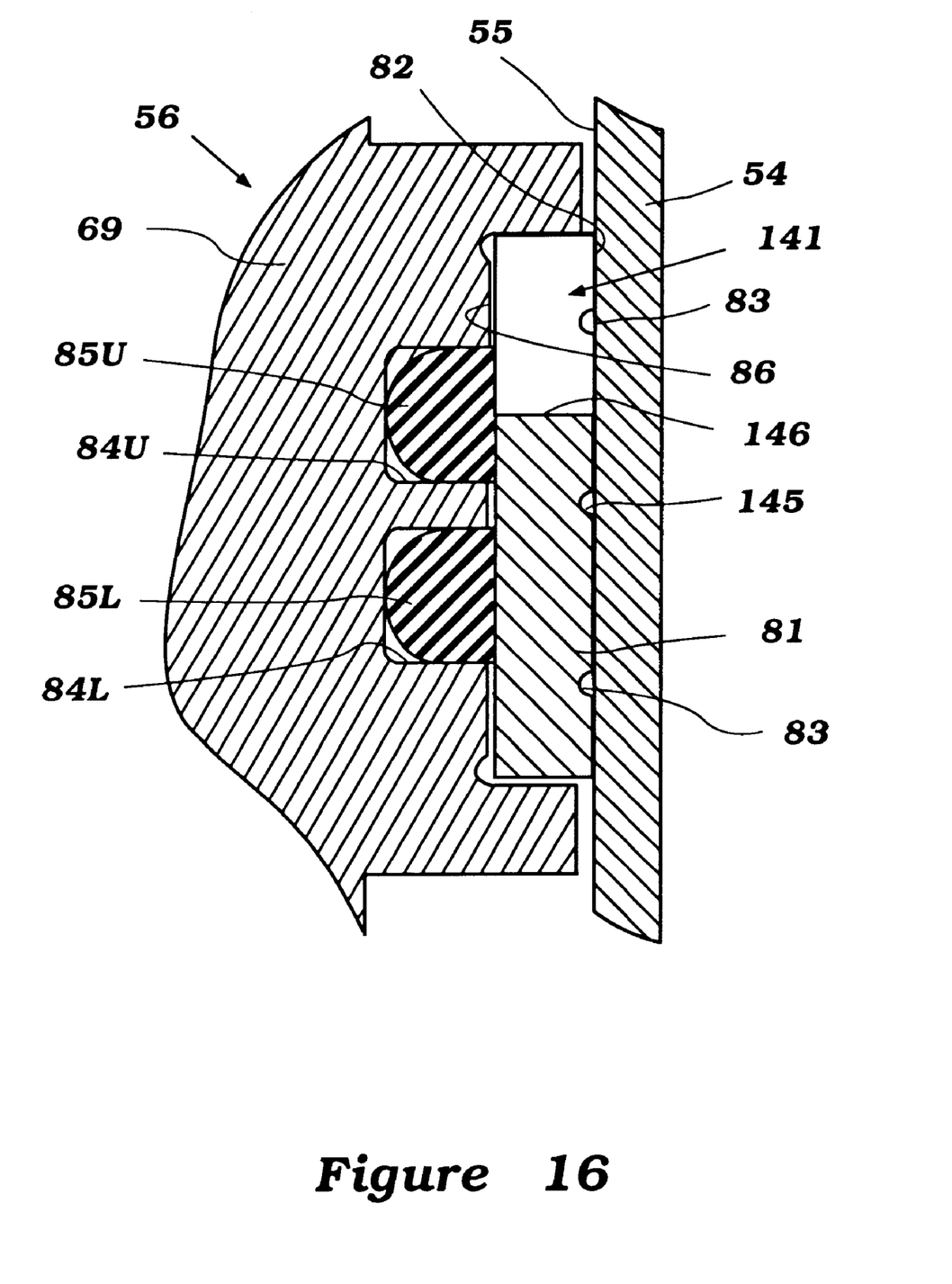
FIG. 16 is an enlarged cross-sectional view taken along the line 16—16 of FIG.

A lower slot portion 141 extends upwardly to an area that terminates adjacent the O-ring 85$l$ as seen clearly in FIG. 13. A circumferentially extending portion 143 is formed at the termination of the slot 142 and a further axially extending slot 144 is formed there. A pressure balance groove 145 is associated with this slot 144 and covers the area between the O-rings 85$l$ and 85$u$.

Finally, at the upper termination of the slot 144, there is a further radially extending shoulder portion 146 that is defined at the lower terminus of a final upper slot portion 147. The O-ring seal 85$u$ is positioned at the area where the shoulder portion 146 is provided so as to provide a good seal and achieve the results aforenoted.

Thus, from the foregoing description it should be readily apparent that the described embodiment of the invention provide a very effective piston ring seal and on in which the sealing pressure will be maintained constant regardless of pressurization of the chambers above or below the piston ring groove.

It will be readily apparent to those skilled in the art that the foregoing description is that of preferred embodiments of the invention and the various changes and modifications may be made without departing from the spirit and scope of the invention, as defined by the appended claims.

What is claimed is:

1. A piston sealing arrangement in a shock absorber having a hydraulic cylinder in which a piston is slidably supported to define a pair of fluid chambers, said piston being provided with a peripheral ring groove in which a sealing piston ring is provided, a communicating passage arrangement formed in said piston ring between the exterior surface of said piston ring which engages said cylinder bore with the interior surface of said piston ring that faces said piston peripheral ring groove so as to balance the fluid pressure acting on opposite sides of said piston ring, and a seal between said piston peripheral ring groove and said piston ring so as to preclude fluid flow from one fluid chamber to the other fluid chamber through said piston peripheral ring groove and said communicating passage arrangement.

2. A piston sealing arrangement as set forth in claim 1 wherein the communicating passage arrangement comprises at least one radially extending passage through the piston ring formed axially on one side of the seal and at least one radially extending passage through the piston ring formed axially on the other side of the seal.

3. A piston sealing arrangement as set forth in claim 2 wherein the radially extending passages are formed by holes extending radially through the piston ring.

4. A piston sealing arrangement as set forth in claim 3 wherein each of the holes terminates in a circumferential groove in the outer surface of the piston ring.

5. A piston sealing arrangement as set forth in claim 1 wherein the communicating passage arrangement comprises at least one axially extending slot through the piston ring formed on one axial side of the seal and at least one axially extending slot through the piston ring formed on the other axial side of said seal.

6. A piston sealing arrangement as set forth in claim 5 wherein the axially extending slots are spaced circumferentially from each other.

7. A piston sealing arrangement as set forth in claim 6 wherein each of the axially extending slots intersects a circumferential groove in the outer surface of the piston ring.

8. A piston sealing arrangement as set forth in claim 6 wherein the axially extending slots are connected to each other by a circumferentially extending slot through the piston ring, the seal being provided at said circumferentially extending slot.

9. A piston sealing arrangement as set forth in claim 8 wherein each of the axially extending slots intersects a circumferential groove in the outer surface of the piston ring.

10. A piston sealing arrangement as set forth in claim 1 wherein the seal is provided by an O-ring received in a groove at the base of the piston peripheral ring groove of the piston.

11. A piston sealing arrangement as set forth in claim 10 further including a pair of axially spaced circumferential grooves in the outer surface of the piston ring.

12. A piston sealing arrangement as set forth in claim 11 wherein the circumferential grooves are disposed on opposite axial sides of the seal.

13. A piston sealing arrangement as set forth in claim 12 wherein there are two circumferential grooves on each axial side of the seal.

14. A piston sealing arrangement as set forth in claim 12 wherein the communicating passage arrangement comprises at least one axially extending slot through the piston ring formed on one axial side of the seal and at least one axially extending slot through the piston ring formed on the other axial side of said seal.

15. A piston sealing arrangement as set forth in claim 14 wherein the axially extending slots are connected to each other by a circumferentially extending slot through the piston ring, the O-ring being provided at said circumferentially extending slot.

16. A piston sealing arrangement as set forth in claim 15 wherein the O-ring is received in a groove at the base of the piston peripheral ring groove of the piston.

17. A piston sealing arrangement as set forth in claim 16 wherein the circumferentially extending slot is stepped with axially spaced circumferential portions each intersecting a respective one of the axially extending slots and connected to each other by a third axially extending slot.

18. A piston sealing arrangement as set forth in claim 17 further including a third circumferentially extending groove in the outer surface of the piston ring intersecting the third axially extending slot.

19. A piston sealing arrangement as set forth in claim 18 wherein the O-ring comprises a pair of O-rings each disposed in the area of a respective one of the first mentioned axially extending slots.

20. A piston sealing arrangement as set forth in claim 14 wherein there are two circumferential grooves on each axial side of the seal.

* * * * *